United States Patent
Vargaftik et al.

(10) Patent No.: US 11,899,594 B2
(45) Date of Patent: Feb. 13, 2024

(54) MAINTENANCE OF DATA MESSAGE CLASSIFICATION CACHE ON SMART NIC

(71) Applicant: VMware LLC, Palo Alto, CA (US)

(72) Inventors: Shay Vargaftik, Herzliya (IL); Alex Markuze, Rosh HaAyin (IL); Yaniv Ben-Itzhak, Afek (IL); Igor Golikov, Kfar Saba (IL); Avishay Yanai, Petach-Tikva (IL)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/845,658

(22) Filed: Jun. 21, 2022

(65) Prior Publication Data

US 2023/0409488 A1  Dec. 21, 2023

(51) Int. Cl.
  *G06F 12/121* (2016.01)
  *G06F 13/16* (2006.01)
  *G06F 12/0815* (2016.01)

(52) U.S. Cl.
  CPC ........ *G06F 12/121* (2013.01); *G06F 12/0815* (2013.01); *G06F 13/1668* (2013.01); *G06F 2213/3808* (2013.01)

(58) Field of Classification Search
  None
  See application file for complete search history.

(56) References Cited

U.S. PATENT DOCUMENTS

| | | | |
|---|---|---|---|
| 5,884,313 A | 3/1999 | Talluri et al. | |
| 5,887,134 A | 3/1999 | Ebrahim | |
| 5,974,547 A | 10/1999 | Klimenko | |
| 6,141,749 A | 10/2000 | Coss et al. | |
| 6,219,699 B1 | 4/2001 | McCloghrie et al. | |
| 6,393,483 B1 | 5/2002 | Latif et al. | |
| 6,496,935 B1 | 12/2002 | Fink et al. | |
| 6,594,704 B1 | 7/2003 | Birenback et al. | |

(Continued)

FOREIGN PATENT DOCUMENTS

| | | |
|---|---|---|
| CA | 2672100 A1 | 6/2008 |
| CA | 2918551 A1 | 7/2010 |

(Continued)

OTHER PUBLICATIONS

Non-Published Commonly Owned Related International Patent Application PCT/US2023/022192 with similar specification, filed May 14, 2023, 39 pages, VMware, Inc.

(Continued)

*Primary Examiner* — Edward J Dudek, Jr.
*Assistant Examiner* — Ralph A Verderamo, III
(74) *Attorney, Agent, or Firm* — Quarles & Brady LLP

(57) ABSTRACT

Some embodiments provide a method for performing data message processing at a smart NIC of a computer that executes a software forwarding element (SFE). The method stores (i) a set of cache entries that the smart NIC uses to process a set of received data messages without providing the data messages to the SFE and (ii) rule updates used by the smart NIC to validate the cache entries. After a period of time, the method determines that the rule updates are incorporated into a data message processing structure of the SFE. Upon incorporating the rule updates, the method deletes from the smart NIC (i) the rule updates and (ii) at least a subset of the cache entries.

25 Claims, 11 Drawing Sheets

(56) References Cited

U.S. PATENT DOCUMENTS

| | | |
|---|---|---|
| 6,738,821 B1 | 5/2004 | Wilson et al. |
| 6,856,995 B1 | 2/2005 | Ibitayo et al. |
| 6,880,089 B1 | 4/2005 | Bommareddy et al. |
| 6,963,921 B1 | 11/2005 | Yang et al. |
| 7,055,173 B1 | 5/2006 | Chaganty et al. |
| 7,079,544 B2 | 7/2006 | Wakayama et al. |
| 7,136,926 B1 | 11/2006 | Iyer et al. |
| 7,349,382 B2 | 3/2008 | Marimuthu et al. |
| 7,424,710 B1 | 9/2008 | Nelson et al. |
| 7,512,071 B2 | 3/2009 | Goldschmidt et al. |
| 7,606,260 B2 | 10/2009 | Oguchi et al. |
| 7,760,733 B1 | 7/2010 | Eiriksson et al. |
| 7,774,502 B2 | 8/2010 | Murthy et al. |
| 7,818,452 B2 | 10/2010 | Matthews et al. |
| 7,849,168 B2 | 12/2010 | Utsunomiya et al. |
| 7,853,998 B2 | 12/2010 | Blaisdell et al. |
| 7,913,294 B1 | 3/2011 | Maufer et al. |
| 7,948,986 B1 | 5/2011 | Ghosh et al. |
| 8,032,933 B2 | 10/2011 | Turley et al. |
| 8,108,550 B2 | 1/2012 | Lahoti et al. |
| 8,145,768 B1 | 3/2012 | Hawthorne |
| 8,190,767 B1 | 5/2012 | Maufer et al. |
| 8,194,674 B1 | 6/2012 | Pagel et al. |
| 8,346,919 B1 | 1/2013 | Eiriksson et al. |
| 8,365,294 B2 | 1/2013 | Ross |
| 8,442,059 B1 | 5/2013 | Iglesia et al. |
| 8,615,009 B1 | 12/2013 | Ramamoorthi et al. |
| 8,660,129 B1 | 2/2014 | Brendel et al. |
| 8,825,900 B1 | 9/2014 | Gross, IV et al. |
| 8,856,518 B2 | 10/2014 | Sridharan et al. |
| 8,930,529 B1 | 1/2015 | Wang et al. |
| 8,931,047 B2 | 1/2015 | Wanser et al. |
| 9,008,082 B2 | 4/2015 | Dyke |
| 9,008,085 B2 | 4/2015 | Kamble et al. |
| 9,015,823 B2 | 4/2015 | Koponen et al. |
| 9,047,109 B1 | 6/2015 | Wang et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,148,895 B2 | 9/2015 | PalChaudhuri et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,325,739 B1 | 4/2016 | Roth et al. |
| 9,378,161 B1 | 6/2016 | Dalal et al. |
| 9,380,027 B1 | 6/2016 | Lian et al. |
| 9,419,897 B2 | 8/2016 | Cherian et al. |
| 9,460,031 B1 | 10/2016 | Dalal et al. |
| 9,621,516 B2 | 4/2017 | Basak et al. |
| 9,634,990 B2 | 4/2017 | Lee |
| 9,692,698 B2 | 6/2017 | Cherian et al. |
| 9,697,019 B1 | 7/2017 | Fitzgerald et al. |
| 9,729,512 B2 | 8/2017 | Jain et al. |
| 9,755,903 B2 | 9/2017 | Masurekar et al. |
| 9,806,948 B2 | 10/2017 | Masurekar et al. |
| 9,825,913 B2 | 11/2017 | Jain et al. |
| 9,916,269 B1 | 3/2018 | Machulsky et al. |
| 9,952,782 B1 | 4/2018 | Chandrasekaran et al. |
| 10,050,884 B1 | 8/2018 | Dhanabalan et al. |
| 10,142,127 B2 | 11/2018 | Cherian et al. |
| 10,162,793 B1 | 12/2018 | BShara et al. |
| 10,193,771 B2 | 1/2019 | Koponen et al. |
| 10,284,478 B2 | 5/2019 | Yokota |
| 10,341,296 B2 | 7/2019 | Bhagwat et al. |
| 10,534,629 B1 | 1/2020 | Pierre et al. |
| 10,567,308 B1 | 2/2020 | Subbiah et al. |
| 10,873,566 B2 | 12/2020 | Han |
| 10,997,106 B2 | 5/2021 | Bandaru et al. |
| 11,005,755 B2 | 5/2021 | Yu et al. |
| 11,019,030 B2 | 5/2021 | Jain et al. |
| 11,038,845 B2 | 6/2021 | Han |
| 11,108,593 B2 | 8/2021 | Cherian et al. |
| 11,221,972 B1 | 1/2022 | Raman et al. |
| 11,385,981 B1 | 7/2022 | Silakov et al. |
| 11,593,278 B2 | 2/2023 | Kim et al. |
| 11,606,310 B2 | 3/2023 | Ang et al. |
| 11,636,053 B2 | 4/2023 | Kim et al. |
| 11,677,719 B2 | 6/2023 | Han |
| 11,716,383 B2 | 8/2023 | Kim et al. |
| 11,736,565 B2 | 8/2023 | Cherian et al. |
| 11,736,566 B2 | 8/2023 | Cherian et al. |
| 2002/0069245 A1 | 6/2002 | Kim |
| 2003/0005144 A1 | 1/2003 | Engel et al. |
| 2003/0093481 A1 | 5/2003 | Mitchell et al. |
| 2003/0097589 A1 | 5/2003 | Syvanne |
| 2003/0123452 A1 | 7/2003 | Cox et al. |
| 2003/0130833 A1 | 7/2003 | Brownell et al. |
| 2003/0140124 A1 | 7/2003 | Burns |
| 2003/0145114 A1 | 7/2003 | Gertner |
| 2003/0161272 A1 | 8/2003 | Teplitsky |
| 2003/0200290 A1 | 10/2003 | Zimmerman et al. |
| 2003/0212900 A1 | 11/2003 | Liu et al. |
| 2003/0217119 A1 | 11/2003 | Raman et al. |
| 2004/0022259 A1 | 2/2004 | Tuchow |
| 2004/0042464 A1 | 3/2004 | Elzur et al. |
| 2004/0049701 A1 | 3/2004 | Pennec et al. |
| 2005/0053079 A1 | 3/2005 | Havala |
| 2005/0114337 A1 | 5/2005 | Lunteren |
| 2005/0198125 A1 | 9/2005 | Beck et al. |
| 2005/0229246 A1 | 10/2005 | Rajagopal et al. |
| 2005/0238022 A1 | 10/2005 | Panigrahy |
| 2006/0002386 A1 | 1/2006 | Yik et al. |
| 2006/0029056 A1 | 2/2006 | Perera et al. |
| 2006/0041894 A1 | 2/2006 | Cheng et al. |
| 2006/0191003 A1 | 8/2006 | Bahk et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0011734 A1 | 1/2007 | Balakrishnan et al. |
| 2007/0056038 A1 | 3/2007 | Lok |
| 2007/0061492 A1 | 3/2007 | Riel |
| 2007/0174850 A1 | 7/2007 | Zur |
| 2008/0008202 A1 | 1/2008 | Terrell et al. |
| 2008/0028097 A1 | 1/2008 | Makela |
| 2008/0072305 A1 | 3/2008 | Casado et al. |
| 2008/0086620 A1 | 4/2008 | Morris |
| 2008/0163207 A1 | 7/2008 | Reumann et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007251 A1 | 1/2009 | Abzarian et al. |
| 2009/0089537 A1 | 4/2009 | Vick et al. |
| 2009/0119087 A1 | 5/2009 | Ang et al. |
| 2009/0129271 A1 | 5/2009 | Ramankutty et al. |
| 2009/0129394 A1 | 5/2009 | Bar-Kovetz et al. |
| 2009/0150521 A1 | 6/2009 | Tripathi |
| 2009/0161547 A1 | 6/2009 | Riddle et al. |
| 2009/0161673 A1 | 6/2009 | Breslau et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0327781 A1 | 12/2009 | Tripathi |
| 2010/0014526 A1 | 1/2010 | Chavan et al. |
| 2010/0037311 A1 | 2/2010 | He et al. |
| 2010/0070677 A1 | 3/2010 | Thakkar |
| 2010/0100616 A1 | 4/2010 | Bryson et al. |
| 2010/0115174 A1 | 5/2010 | Akyol et al. |
| 2010/0115208 A1 | 5/2010 | Logan |
| 2010/0125667 A1 | 5/2010 | Soundararajan |
| 2010/0165874 A1 | 7/2010 | Brown et al. |
| 2010/0257580 A1 | 10/2010 | Zhao |
| 2010/0275199 A1 | 10/2010 | Smith et al. |
| 2010/0287306 A1 | 11/2010 | Matsuda |
| 2011/0016467 A1 | 1/2011 | Kane |
| 2011/0022695 A1 | 1/2011 | Dalal et al. |
| 2011/0060859 A1 | 3/2011 | Shukla et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0134920 A1 | 6/2011 | Dyke |
| 2011/0219170 A1 | 9/2011 | Frost et al. |
| 2011/0225647 A1 | 9/2011 | Dilley et al. |
| 2011/0246637 A1 | 10/2011 | Murakami |

(56) References Cited

U.S. PATENT DOCUMENTS

| | | |
|---|---|---|
| 2012/0042138 A1 | 2/2012 | Guchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0207039 A1 | 8/2012 | Srinivasan et al. |
| 2012/0207174 A1 | 8/2012 | Shieh |
| 2012/0240182 A1 | 9/2012 | Narayanaswamy et al. |
| 2012/0259953 A1 | 10/2012 | Gertner |
| 2012/0278584 A1 | 11/2012 | Nagami et al. |
| 2012/0290703 A1 | 11/2012 | Barabash et al. |
| 2012/0320918 A1 | 12/2012 | Fomin et al. |
| 2013/0007740 A1 | 1/2013 | Kikuchi et al. |
| 2013/0033993 A1 | 2/2013 | Cardona et al. |
| 2013/0044631 A1 | 2/2013 | Biswas et al. |
| 2013/0058346 A1 | 3/2013 | Sridharan et al. |
| 2013/0061047 A1 | 3/2013 | Sridharan et al. |
| 2013/0073702 A1 | 3/2013 | Umbehocker |
| 2013/0073743 A1 | 3/2013 | Ramasamy et al. |
| 2013/0125122 A1 | 5/2013 | Hansen |
| 2013/0125230 A1 | 5/2013 | Koponen et al. |
| 2013/0145106 A1 | 6/2013 | Kan |
| 2013/0163594 A1 | 6/2013 | Sharma et al. |
| 2013/0227097 A1 | 8/2013 | Yasuda et al. |
| 2013/0227550 A1 | 8/2013 | Weinstein et al. |
| 2013/0265883 A1 | 10/2013 | Henry et al. |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2013/0332983 A1 | 12/2013 | Koorevaar et al. |
| 2013/0346583 A1 | 12/2013 | Low et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0068602 A1 | 3/2014 | Gember et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0164595 A1 | 6/2014 | Bray et al. |
| 2014/0195666 A1 | 7/2014 | Dumitriu et al. |
| 2014/0201305 A1 | 7/2014 | Dalal et al. |
| 2014/0208075 A1 | 7/2014 | McCormick, Jr. |
| 2014/0215036 A1 | 7/2014 | Elzur |
| 2014/0244983 A1 | 8/2014 | McDonald et al. |
| 2014/0245296 A1 | 8/2014 | Sethuramalingam et al. |
| 2014/0245423 A1 | 8/2014 | Lee |
| 2014/0269712 A1 | 9/2014 | Kidambi |
| 2014/0269754 A1 | 9/2014 | Eguchi et al. |
| 2014/0281030 A1 | 9/2014 | Cui et al. |
| 2014/0282855 A1 | 9/2014 | Clark et al. |
| 2014/0330977 A1 | 11/2014 | Bemmel |
| 2014/0373148 A1 | 12/2014 | Nelms et al. |
| 2014/0376367 A1 | 12/2014 | Jain et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0082417 A1 | 3/2015 | Bhagwat et al. |
| 2015/0117445 A1 | 4/2015 | Koponen et al. |
| 2015/0156250 A1 | 6/2015 | Varshney et al. |
| 2015/0172183 A1 | 6/2015 | DeCusatis et al. |
| 2015/0200808 A1 | 7/2015 | Gourlay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237013 A1 | 8/2015 | Bansal et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0281178 A1 | 10/2015 | Raman et al. |
| 2015/0281179 A1 | 10/2015 | Raman et al. |
| 2015/0326532 A1 | 11/2015 | Grant et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0142320 A1 | 5/2016 | Gyllenhammer et al. |
| 2016/0156591 A1 | 6/2016 | Zhou et al. |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0239330 A1 | 8/2016 | Bride et al. |
| 2016/0285913 A1 | 9/2016 | Itskin et al. |
| 2016/0294858 A1 | 10/2016 | Woolward et al. |
| 2016/0306648 A1 | 10/2016 | Deguillard et al. |
| 2017/0005986 A1 | 1/2017 | Bansal et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0161090 A1 | 6/2017 | Kodama |
| 2017/0161189 A1 | 6/2017 | Gertner |
| 2017/0180273 A1 | 6/2017 | Daly et al. |
| 2017/0180414 A1 | 6/2017 | Andrews et al. |
| 2017/0187679 A1 | 6/2017 | Basak et al. |
| 2017/0195454 A1 | 7/2017 | Shieh |
| 2017/0208100 A1 | 7/2017 | Lian et al. |
| 2017/0214549 A1 | 7/2017 | Yoshino et al. |
| 2017/0244671 A1 | 8/2017 | Kamalakantha et al. |
| 2017/0244673 A1 | 8/2017 | Han |
| 2017/0244674 A1 | 8/2017 | Han |
| 2017/0264622 A1 | 9/2017 | Cooper et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0097778 A1 | 4/2018 | Jain et al. |
| 2018/0109471 A1 | 4/2018 | Chang et al. |
| 2018/0152540 A1 | 5/2018 | Niell et al. |
| 2018/0203719 A1 | 7/2018 | Zhang et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0026146 A1* | 1/2019 | Peffers ............... G06F 9/5044 |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |

(56) References Cited

U.S. PATENT DOCUMENTS

| | | |
|---|---|---|
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0382329 A1 | 12/2020 | Yuan |
| 2020/0401320 A1 | 12/2020 | Pyati et al. |
| 2020/0412659 A1 | 12/2020 | Titzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0176212 A1 | 6/2021 | Han |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0273911 A1 | 9/2021 | Jain et al. |
| 2021/0314232 A1 | 10/2021 | Nainar et al. |
| 2021/0357242 A1 | 11/2021 | Ballard et al. |
| 2021/0359955 A1* | 11/2021 | Musleh ............ G06F 15/17331 |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103490 A1 | 3/2022 | Kim et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |
| 2023/0195488 A1 | 6/2023 | Ang et al. |
| 2023/0195675 A1 | 6/2023 | Ang et al. |
| 2023/0198833 A1 | 6/2023 | Ang et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 2748750 A1 | 7/2014 |
| EP | 3598291 A1 | 1/2020 |
| EP | 4160424 A2 | 4/2023 |
| TW | 202107297 A | 2/2021 |
| WO | 2005099201 A2 | 10/2005 |
| WO | 2007036372 A1 | 4/2007 |
| WO | 2008095010 A1 | 8/2008 |
| WO | 2010008984 A2 | 1/2010 |
| WO | 2013074828 A1 | 5/2013 |
| WO | 2015187201 A1 | 12/2015 |
| WO | 2016003489 A1 | 1/2016 |
| WO | 2020027913 A1 | 2/2020 |
| WO | 2020211071 A1 | 10/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |
| WO | 2023121720 A1 | 6/2023 |

OTHER PUBLICATIONS

Non-Published Commonly Owned U.S. Appl. No. 18/196,844, filed May 12, 2023, 41 pages, Nicira, Inc.

Anwer, Muhammad Bilal, et al., "Building a Fast, Virtualized Data Plane with Programmable Hardware," Aug. 17, 2009, 8 pages, VISA'09, ACM, Barcelona, Spain.

Author Unknown, "8.6 Receive-Side Scaling (RSS)," Month Unknown 2020, 2 pages, Red Hat, Inc.

Author Unknown, "An Introduction to SmartNICs" The Next Platform, Mar. 4, 2019, 4 pages, retrieved from https://www.nextplatform.com/2019/03/04/an-introduction-to-smartnics/.

Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.

Author Unknown, "Package Manager," Wikipedia, Sep. 8, 2020, 10 pages.

Author Unknown, "VMDK", Wikipedia, May 17, 2020, 3 pages, retrieved from https://en.wikipedia.org/w/index.php?title=VMDK&oldid=957225521.

Author Unknown, "vSAN Planning and Deployment" Update 3, Aug. 20, 2019, 85 pages, VMware, Inc., Palo Alto, CA, USA.

Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.

Author Unknown, "What is End-to-End Encryption and How does it Work?," Mar. 7, 2018, 4 pages, Proton Technologies AG, Geneva, Switzerland.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.

Harris, Jim, "Accelerating NVME-oF* for VMs with the Storage Performance Development Kit," Flash Memory Summit, Aug. 2017, 18 pages, Intel Corporation, Santa Clara, CA.

Herbert, Tom, et al., "Scaling in the Linux Networking Stack," Jun. 2, 2020, 9 pages, retrieved from https://01.org/linuxgraphics/gfx-docs/drm/networking/scaling.html.

Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.

Liu, Ming, et al., "Offloading Distributed Applications onto SmartNICs using iPipe," SIGCOMM '19, Aug. 19-23, 2019, 16 pages, ACM, Beijing, China.

Non-Published Commonly Owned U.S. Appl. No. 17/560,142, filed Dec. 22, 2021, 60 pages, VMware, Inc.

Non-Published Commonly Owned U.S. Appl. No. 17/560,148, filed Dec. 22, 2021, 59 pages, VMware, Inc.

Non-Published Commonly Owned U.S. Appl. No. 17/560,153, filed Dec. 22, 2021, 59 pages, VMware, Inc.

Non-Published Commonly Owned U.S. Appl. No. 17/826,911, filed May 27, 2022, 29 pages, VMware, Inc.

Non-Published Commonly Owned Related U.S. Appl. No. 17/845,661 with similar specification, filed Jun. 21, 2022, 39 pages, VMware, Inc.

Non-Published Commonly Owned U.S. Appl. No. 17/845,740, filed Jun. 21, 2022, 31 pages, VMware, Inc.

Non-Published Commonly Owned U.S. Appl. No. 17/845,766, filed Jun. 21, 2022, 26 pages, VMware, Inc.

Perlroth, Nicole, "What is End-to-End Encryption? Another Bull's-

(56) References Cited

OTHER PUBLICATIONS

Eye on Big Tech," The New York Times, Nov. 19, 2019, 4 pages, retrieved from https://nytimes.com/2019/11/19/technology/end-to-end-encryption.html.

Peterson, Larry L., et al., "OS Support for General-Purpose Routers," Month Unknown 1999, 6 pages, Department of Computer Science, Princeton University.

Pettit, Justin, et al., "Virtual Switching in an Era of Advanced Edges," In Proc. 2nd Workshop on Data Center—Converged and Virtual Ethernet Switching (DCCAVES), Sep. 2010, 7 pages, vol. 22. ITC.

Spalink, Tammo, et al., "Building a Robust Software-Based Router Using Network Processors," Month Unknown 2001, 14 pages, ACM, Banff, Canada.

Stringer, Joe, et al., "OVS Hardware Offloads Discussion Panel," Nov. 7, 2016, 37 pages, retrieved from http://openvswitch.org/support/ovscon2016/7/1450-stringer.pdf.

Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.

Turner, Jon, et al., "Supercharging PlanetLab—High Performance, Multi-Application Overlay Network Platform," SIGCOMM-07, Aug. 27-31, 2007, 12 pages, ACM, Koyoto, Japan.

Author Unknown, "Cisco Identity-Based Firewall Security," Month Unknown 2011, 2 pages, CISCO Systems, Ind.

Author Unknown, "Hypervisor," Aug. 13, 2020, 1 page, VMware.com.

Author Unknown, "Transparent," Free On-Line Dictionary of Computing (FOLDOC), Jun. 6, 1996, 1 page, retrieved from http://foldoc.org/transparent.

Author Unknown, "AppLogic Features," Jul. 2007, 2 pages, 3TERA, Inc.

Author Unknown, "Enabling Service Chaining on Cisco Nexus 1000V Series," Month Unknown, 2012, 25 pages, CISCO.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Li, Junnan, et al., "DrawerPipe: A Reconfigurable Pipeline for Network Processing on FGPA-Based SmartNIC," Electronics 2020, Dec. 10, 2019, 24 pages, retrieved from https://www.mdpi.com/2079-9292/9/1/59.

Litvak, Michail, "Linux—IP-RULE(8): Routing Policy Database Management," Apr. 10, 2014, 5 pages, retrieved from https://man7.org/linux/man-pages/man8/ip-rule.8.html.

Mohammadkhan, Ali, et al., "P4NFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.

Non-Published Commonly Owned U.S. Appl. No. 18/226,775, filed Jul. 27, 2023, 63 pages, Nicira, Inc.

Non-Published Commonly Owned U.S. Appl. No. 18/235,860, filed Aug. 20, 2023, 58 pages, VMware, Inc.

Olds, Dan, "OS Virtualization vs. Hypervisor: Why You Should Offer Both," Oct. 19, 2008, 3 pages, techtarget.com.

Pagiamtzis, Kostas, et al., "Content-Addressable Memory (CAM) Circuits and Architectures: A Tutorial and Survey," IEEE Journal of Solid-State Circuits, Mar. 2006, 16 pages, vol. 41, No. 3.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

Angeles, Sara, "Cloud vs. Data Center: What's the difference?" Nov. 23, 2018, 1 page, retrieved from https://www.businessnewsdaily.com/4982-cloud-vs-data-center.html.

Author Unknown, "Middlebox," Wikipedia, Nov. 19, 2019, 1 page, Wikipedia.com.

Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.

\* cited by examiner

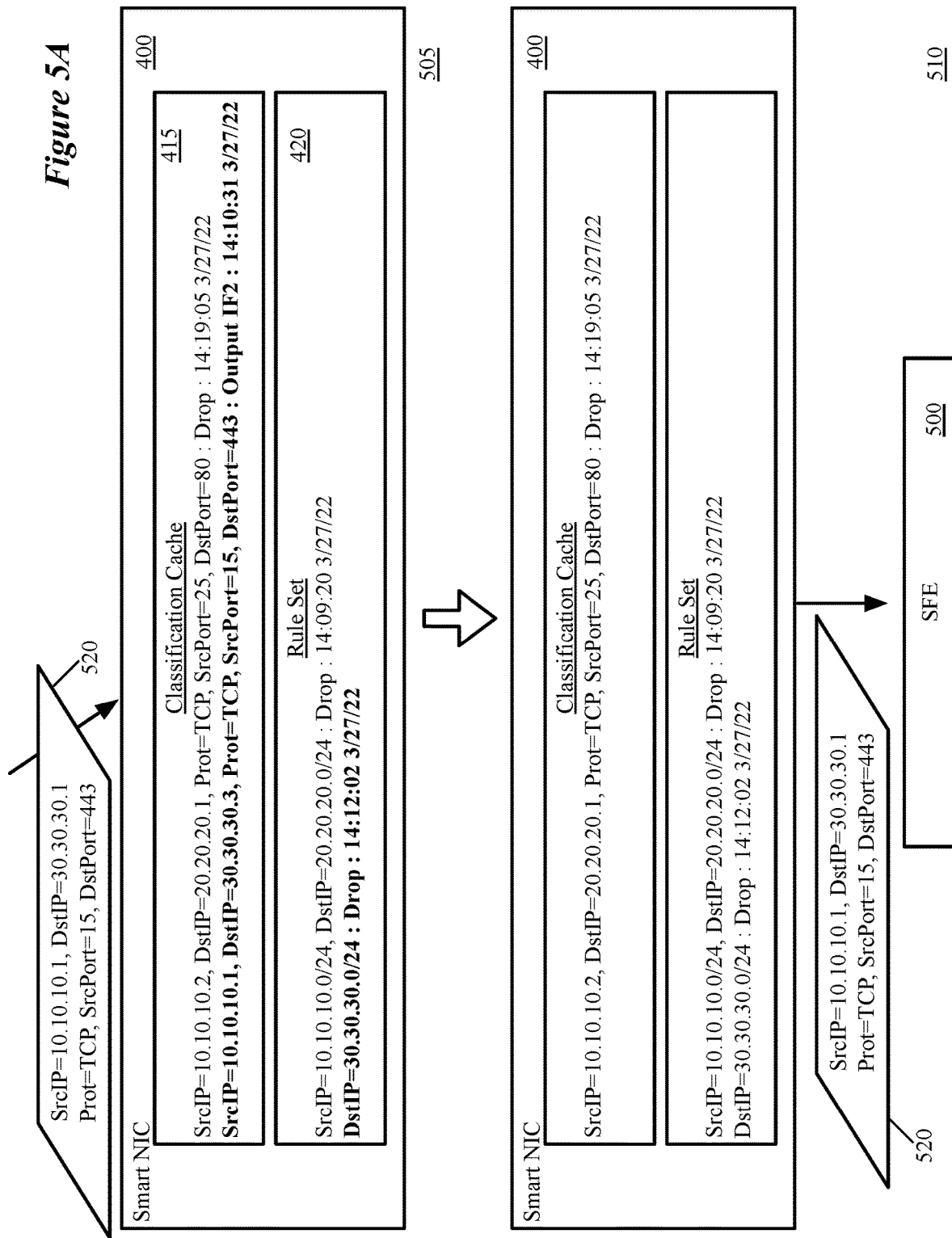

Smart NIC 700

Time = 14:30:00 3/27/22

Classification Cache 1 (Creation 14:20:00 3/27/22) 705

~~SrcIP=10.10.10.2, DstIP=20.20.20.1, Prot=TCP, SrcPort=25, DstPort=80 : Drop : 14:20:05 3/27/22~~
~~SrcIP=10.10.10.1, DstIP=30.30.30.3, Prot=TCP, SrcPort=15, DstPort=443 : Output IF1 : 14:23:46 3/27/22~~
~~SrcIP=10.10.10.3, DstIP=30.30.30.3, Prot=TCP, SrcPort=84, DstPort=443 : Output IF1 : 14:26:34 3/27/22~~
~~SrcIP=10.10.20.1, DstIP=40.40.40.1, Prot=UDP, SrcPort=17, DstPort=80 : Output IF2 : 14:29:13 3/27/22~~

Classification Cache 2 (Creation 14:25:00 3/27/22) 710

SrcIP=10.10.10.1, DstIP=30.30.30.3, Prot=TCP, SrcPort=15, DstPort=443 : Output IF1 : 14:25:46 3/27/22
SrcIP=10.10.10.3, DstIP=30.30.30.3, Prot=TCP, SrcPort=84, DstPort=443 : Output IF1 : 14:26:37 3/27/22
SrcIP=10.10.20.1, DstIP=40.40.40.1, Prot=UDP, SrcPort=17, DstPort=80 : Output IF2 : 14:29:33 3/27/22
SrcIP=10.10.20.3, DstIP=20.20.20.2, Prot=TCP, SrcPort=14, DstPort=443 : Output IF1 : 14:29:53 3/27/22

Rule Update Set 715

SrcIP=10.10.10.0/24, DstIP=20.20.20.0/24 : Drop : 14:23:20 3/27/22
DstIP=20.20.20.1 : Drop : 14:28:02 3/27/22
DstIP=50.50.50.0/24 : Output IF3 : 14:29:45 3/27/22

*Figure 7A*

Smart NIC 700

Time = 14:31:00 3/27/22

Classification Cache 2 (Creation 14:25:00 3/27/22) 710

SrcIP=10.10.10.1, DstIP=30.30.30.3, Prot=TCP, SrcPort=15, DstPort=443 : Output IF1 : 14:25:46 3/27/22
SrcIP=10.10.10.3, DstIP=30.30.30.3, Prot=TCP, SrcPort=84, DstPort=443 : Output IF1 : 14:26:37 3/27/22
SrcIP=10.10.20.1, DstIP=40.40.40.1, Prot=UDP, SrcPort=17, DstPort=80 : Output IF2 : 14:29:33 3/27/22
SrcIP=10.10.20.3, DstIP=20.20.20.2, Prot=TCP, SrcPort=14, DstPort=443 : Output IF1 : 14:29:53 3/27/22

Classification Cache 3 (Creation 14:30:00 3/27/22) 720

SrcIP=10.10.10.3, DstIP=30.30.30.3, Prot=TCP, SrcPort=84, DstPort=443 : Output IF1 : 14:30:15 3/27/22
SrcIP=10.10.20.1, DstIP=40.40.40.1, Prot=UDP, SrcPort=17, DstPort=80 : Output IF2 : 14:30:33 3/27/22
SrcIP=10.10.20.3, DstIP=20.20.20.2, Prot=TCP, SrcPort=14, DstPort=443 : Output IF1 : 14:30:53 3/27/22

Rule Update Set 715

SrcIP=10.10.10.0/24, DstIP=20.20.20.0/24 : Drop : 14:23:20 3/27/22
DstIP=20.20.20.1 : Drop : 14:28:02 3/27/22
DstIP=50.50.50.0/24 : Output IF3 : 14:29:45 3/27/22

*Figure 7C*

MAINTENANCE OF DATA MESSAGE CLASSIFICATION CACHE ON SMART NIC

BACKGROUND

Especially in the datacenter context, programmable smart network interface controllers (NICs) are becoming more commonplace. These smart NICs typically include a central processing unit (CPU), possibly in addition to one or more application-specific integrated circuits (ASICs) or field-programmable gate arrays (FPGAs). These ASICs (or FPGAs) can be designed for packet processing as well as other uses. However, the inclusion of the CPU also allows for more configurability of the smart NICs, thereby enabling the offloading of some tasks from software of a host computer.

BRIEF SUMMARY

Some embodiments provide a method for using a smart NIC to perform a subset of data message processing at a computer that executes a software forwarding element (SFE). The smart NIC stores a small data message classification cache that is regularly updated based on data message processing at the SFE. When the smart NIC receives a data message for processing by the SFE, the smart NIC initially determines (i) whether the data message matches any entries in its data message classification cache and (ii) if so, whether the matched entry is valid. If the matched entry is a valid entry, the smart NIC processes the data message according to the actions specified by that entry without providing the data message to the SFE executing on the host computer.

In some embodiments, the SFE populates the data message classification cache with entries based on the processing results of the SFE. That is, when a data message is passed to the SFE, the SFE processes the data message to arrive at a processing result specifying a set of actions (e.g., to modify specific headers of the data message, to provide the data message to a data compute node executing on the computer, to forward the data message to a particular output interface, etc.). The SFE provides a cache entry to the smart NIC indicating (i) a set of match conditions for data messages belonging to the same data message flow as that processed data message (e.g., a 5-tuple indicating source and destination network addresses, source and destination transport layer ports, and transport layer protocol) and (ii) the set of actions for the smart NIC to perform on these subsequent data messages. When subsequent data messages belonging to that data message flow are received at the smart NIC, the smart NIC can process these data messages according to the cache entry without requiring the slower processing by the SFE.

As noted, in some embodiments, in addition to determining whether a received data message matches any of the cache entries, the smart NIC also determines whether a matched entry is valid. The data message processing rules used by the forwarding element may be modified (e.g., rules can be deleted, new rules can be added, etc.) in real-time based on, e.g., updates from a network controller. In some embodiments, the most recently updated rules are stored in a set of rules on the smart NIC with timestamps indicating the time the rule was updated. When a rule is updated at the SFE, the SFE provides this rule update to the smart NIC rule set along with a timestamp indicating the time that the rule was changed.

In addition, the cache entries stored at the smart NIC have timestamps. These timestamps can be the time the cache entry was created or the time the cache entry was last matched and validated, in different embodiments. When a cache entry is matched, the smart NIC identifies whether there are any rules in the rule set that are matched by the data message. If no recent rule is found in the rule set for the data message, then the cache entry is assumed to be valid, and the action(s) specified by the cache entry can be taken by the smart NIC. However, if a rule exists in the rule set for the data message, the timestamp of that rule is compared to the matched cache entry. If the timestamp of the matched cache entry is more recent than the rule, then the cache entry is validated, and the action(s) specified by the cache entry can be taken by the smart NIC.

If the timestamp of the matched cache entry is older than the rule, however, then the cache entry is invalid (because it was created based on processing rules at the SFE at least one of which is no longer in force). For instance, if a rule is identified as having been deleted more recently than the cache entry, the cache entry might have been generated based in part on that deleted rule. If a rule is identified as having been added more recently than the cache entry, then the cache entry would not have been generated based on that new rule and therefore might specify incorrect actions to be taken on the data message.

As such, if the timestamp of the matched cache entry is older than the rule, the smart NIC discards the cache entry and passes the data message to the SFE for processing as though there was a cache miss. The SFE processes the data message and provides a new cache entry to the smart NIC for the smart NIC to add to its cache.

In some embodiments, the cache stored on the smart NIC is relatively small. In certain contexts, when the SFE primarily processes data messages for a small number of large data message flows, the primary savings realized by using the smart NIC comes from having cache entries for these large data message flows so that the many data messages belonging to these flows do not need to be passed on for processing by the SFE.

Because the cache is relatively small, once the cache has reached a fixed maximum size, some embodiments evict entries from the cache when new entries are added. Some embodiments utilize a least recently used (LRU) metric or LRU approximation metric to determine which cache entry to evict when a new cache entry is added. Specifically, some embodiments update the timestamps for the cache entries each time a cache entry is matched and then use these timestamps to identify the LRU entry (i.e., the entry with the earliest timestamp). However, updating the timestamps with every received data message and keeping track of the earliest timestamp can be computationally expensive.

Instead, some embodiments store a separate field that is used to approximate the LRU entry. This separate field attempts to identify the oldest timestamp but is updated in a lazy manner. When a cache entry needs to be evicted, the cache entry identified as having the oldest timestamp is chosen and evicted from the cache. If this cache entry is still needed because the flow is ongoing, the system is self-correcting, as the cache entry will be reinstalled after the next data message in the flow is processed by the SFE.

The rule update table stored on the smart NIC is also size-limited in some embodiments. However, rule updates cannot be simply evicted from the table in the same manner as the cache entries without sacrificing accuracy. Instead, some embodiments regularly clear out both the rule update table and the cache. In different embodiments, the smart NIC clears out the rule update table and cache at regular time intervals or when the rule update table reaches a prespecified size.

In some embodiments, when the smart NIC clears out the rule update table, the SFE rebuilds its data message processing (classifier) data structure (e.g., a set of decision trees, a set of hash tables, etc.). These rules are utilized by the SFE to process data messages prior to their incorporation into the classifier data structure, but at regular intervals (or when enough new rule updates have been received) the SFE rebuilds the classifier so that the faster data message processing enabled by the classifier incorporates these rule updates.

Because the rule updates are no longer stored on the smart NIC to be used for validation of cache entries, the cache entries need to be invalidated to ensure that data messages are not processed using entries based on out-of-date rules. Some embodiments search through the timestamps of the cache entries to identify entries that are newer than any of the rule updates. However, this check is computationally expensive (requiring analysis of all of the timestamps) and it is often easier to rebuild the cache (typically only one data message for each cache entry that is still in use will need to be processed by the SFE in order to regenerate the cache entry).

Some embodiments use a set of multiple caches in order to avoid invalidating all of the cache entries. Specifically, at regular intervals (that are shorter than the time between cache invalidations due to rule update table removal), the smart NIC creates a new cache and releases (deletes) the oldest cache. When data messages arrive, the smart NIC uses any of a number of different algorithms (e.g., round robin, randomization, etc.) to select which of the current caches is queried. If no cache entry is found for a data message, the data message is sent to the SFE for processing and a cache entry for that data message flow will then be installed in the selected cache. As a result, the most common data message flows will have entries in all of the caches. The timing of the new cache creation is such that when the classifier is rebuilt and the rule update table removed, the newest cache is more recent than the last rule update and therefore this cache does not need to be invalidated. Even if this cache is not completely updated, it will typically include entries for the most common data message flows and therefore still be useful.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 5A-5B conceptually illustrate an example of a smart NIC identifying that a data message matches an out-of-date cache entry and providing the data message to an SFE for processing.

FIGS. 7A-C conceptually illustrate the use of sliding window caches such that a cache with valid entries remains when a rule update table is deleted.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for using a smart NIC to perform a subset of data message processing at a computer that executes a software forwarding element (SFE). The smart NIC stores a small data message classification cache that is regularly updated based on data message processing at the SFE. When the smart NIC receives a data message for processing by the SFE, the smart NIC initially determines (i) whether the data message matches any entries in its data message classification cache and (ii) if so, whether the matched entry is valid. If the matched entry is a valid entry, the smart NIC processes the data message according to the actions specified by that entry without providing the data message to the SFE executing on the host computer.

Figure 1:
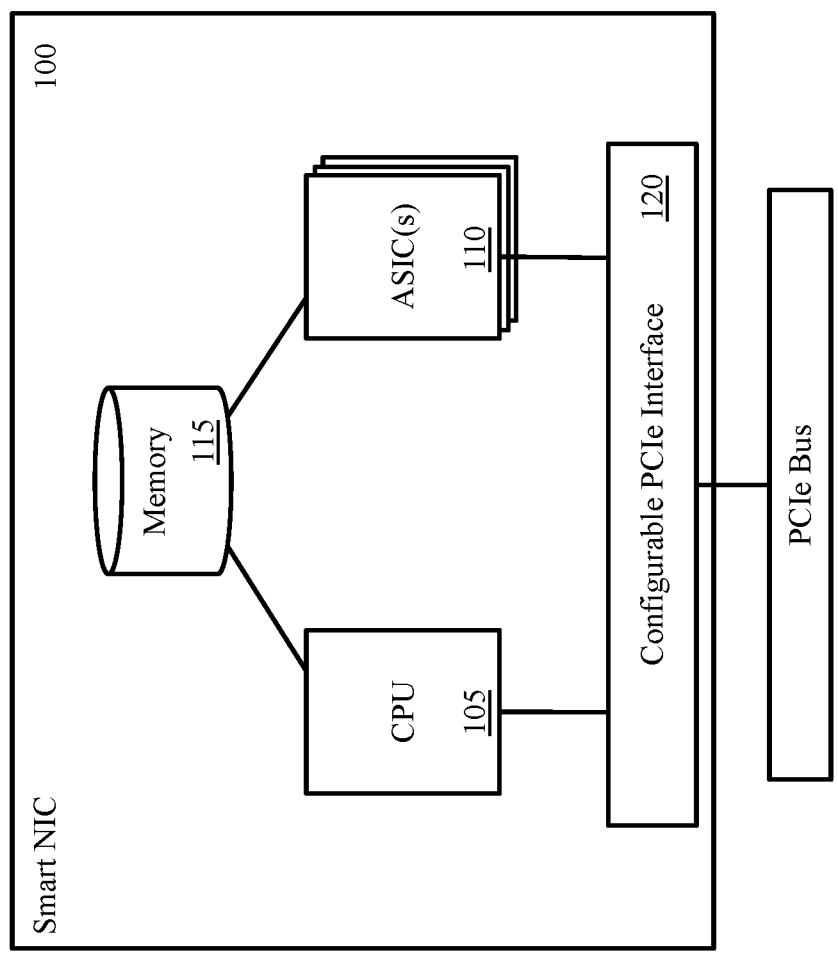
FIG. 1 conceptually illustrates the hardware of a smart NIC of some embodiments that can be configured to perform data message processing using a cache with entries generated by a software forwarding element executing on the computer for which the smart NIC is the interface.

The smart NIC, in some embodiments, is a configurable network interface controller that includes a general-purpose CPU (typically low-power compared to the processor of the computer for which the smart NIC acts as the network interface) in addition to one or more application-specific circuits (e.g., data message processing circuits). FIG. 1 conceptually illustrates the hardware of a smart NIC 100 of some embodiments that can be configured to perform data message processing using a cache with entries generated by a software forwarding element executing on the computer for which the smart NIC is the interface. As shown, the smart NIC 100 includes its own general-purpose (x86) CPU 105, a set of application-specific integrated circuit (ASICs) 110, memory 115, and a configurable PCIe interface 120. The ASICs 110, in some embodiments, include at least one I/O ASIC that handle the processing of data messages forwarded to and from the computer, and are at least partly controlled by the CPU 105. In some embodiments, either in addition to or as an alternative to the ASICs, the smart NIC may include a set of configurable field-programmable gate arrays (FPGAs).

The configurable PCIe interface 120 enables connection of the smart NIC 100 to the other physical components of a computer system (e.g., the x86 CPU, memory, etc.) via the PCIe bus of the computer system. Via this configurable PCIe interface, the smart NIC 100 can present itself to the computer system as a multitude of devices, including a data message processing NIC, a hard disk (using non-volatile memory express (NVMe) over PCIe), or other types of devices. The CPU 105 executes a NIC operating system (OS) in some embodiments that controls the ASICs 110 and can perform other operations as well. In some embodiments, a data message processing ASIC 110 stores the cache entries and performs the operations matching data messages to these cache entries, while the CPU 105 stores rule updates, performs validation of matched cache entries, and manages cache entry invalidation.

Figure 2:
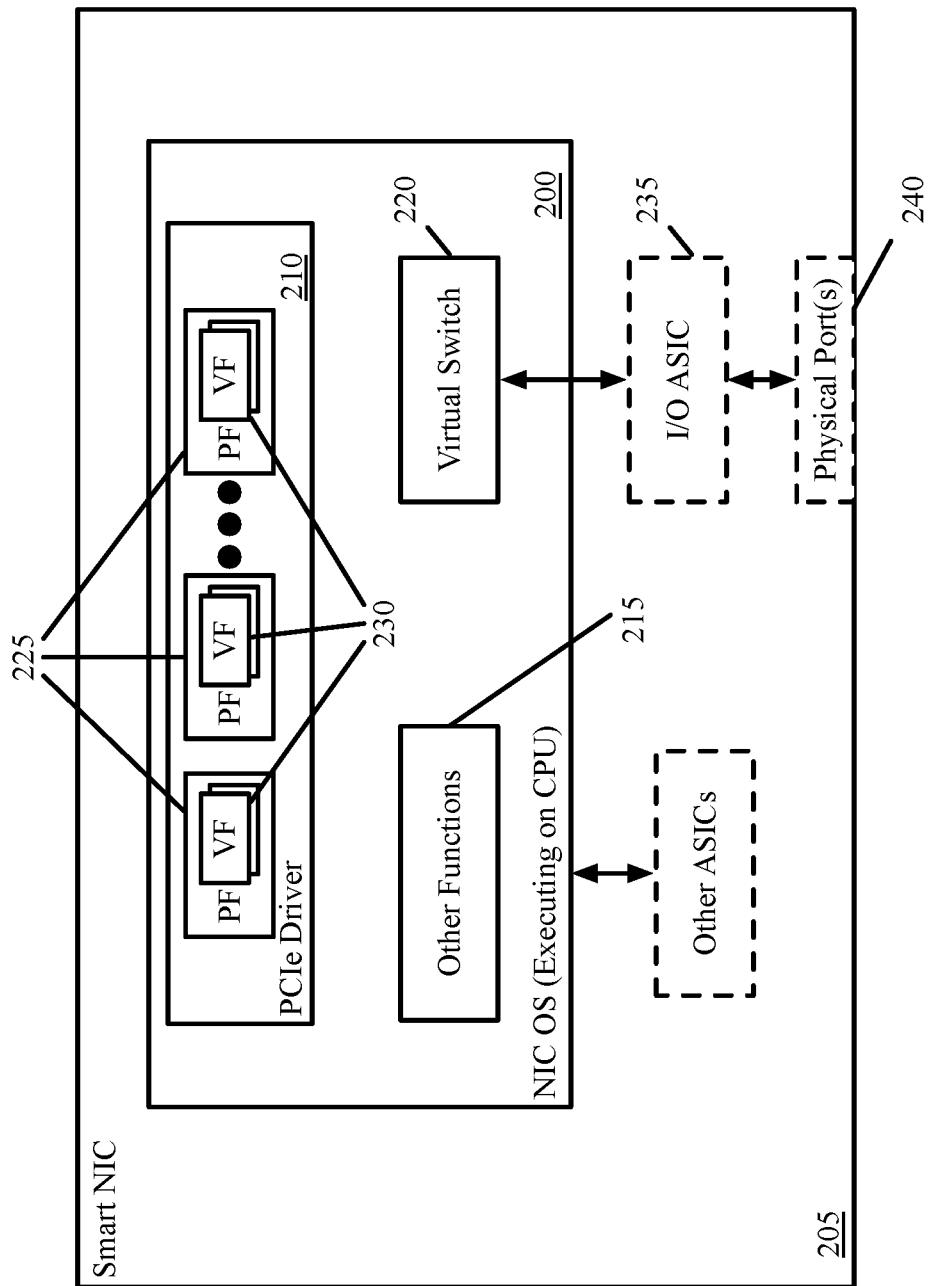
FIG. 2 conceptually illustrates the NIC OS of a smart NIC of some embodiments.

FIG. 2 conceptually illustrates the NIC OS 200 of a smart NIC 205 of some embodiments. The NIC OS 200 is executed, in some embodiments, by the CPU of the smart NIC (e.g., CPU 105). This NIC OS 200 includes a PCIe driver 210, a virtual switch 220, and other functions 215.

The PCIe driver 210 includes multiple physical functions 225, each of which is capable of instantiating multiple virtual functions 230. These different physical functions 225 enable the smart NIC to present as multiple different types of devices to the computer system to which it attaches via its PCIe bus. For instance, the smart NIC can present itself as a network adapter (for processing data messages to and from the computer system) as well as a non-volatile memory express (NVMe) disk in some embodiments.

The NIC OS 200 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 200 of some embodiments executes the virtual switch 220. The virtual switch 220 enables the smart NIC to perform software-defined networking and provide the I/O ASIC 235 of the smart NIC 205 with a set of flow entries (e.g., the cache entries described herein) so that the I/O ASIC 235 can perform flow processing offload (FPO) for the computer system in some embodiments. The I/O ASIC 235, in some embodiments, receives data messages from the network and transmits data messages to the network via one or more physical network ports 240.

The other functions 215 executed by the NIC operating system 200 of some embodiments can include various other operations, including operations not directly related to data message processing (e.g., operations for a machine-learning system). In addition, the NIC operating system 200 (either the virtual switch 220 or other functions 215 of the operating system) may perform various cache entry validation and invalidation operations and maintain a rule update table used to perform the cache entry validation.

As noted, the smart NIC of some embodiments processes data messages using cache entries (e.g., cache entries installed by a software forwarding element (SFE) executing on a computer for which the smart NIC is the interface) such that at least a subset of the data messages received at the smart NIC can be processed without a need to provide the data messages to the SFE. Data message processing by the smart NIC ASIC tends to be faster than processing by the SFE, even before accounting for the savings realized by avoiding the need to pass the data messages to and from the computer (e.g., via the PCIe interface).

Figure 3:
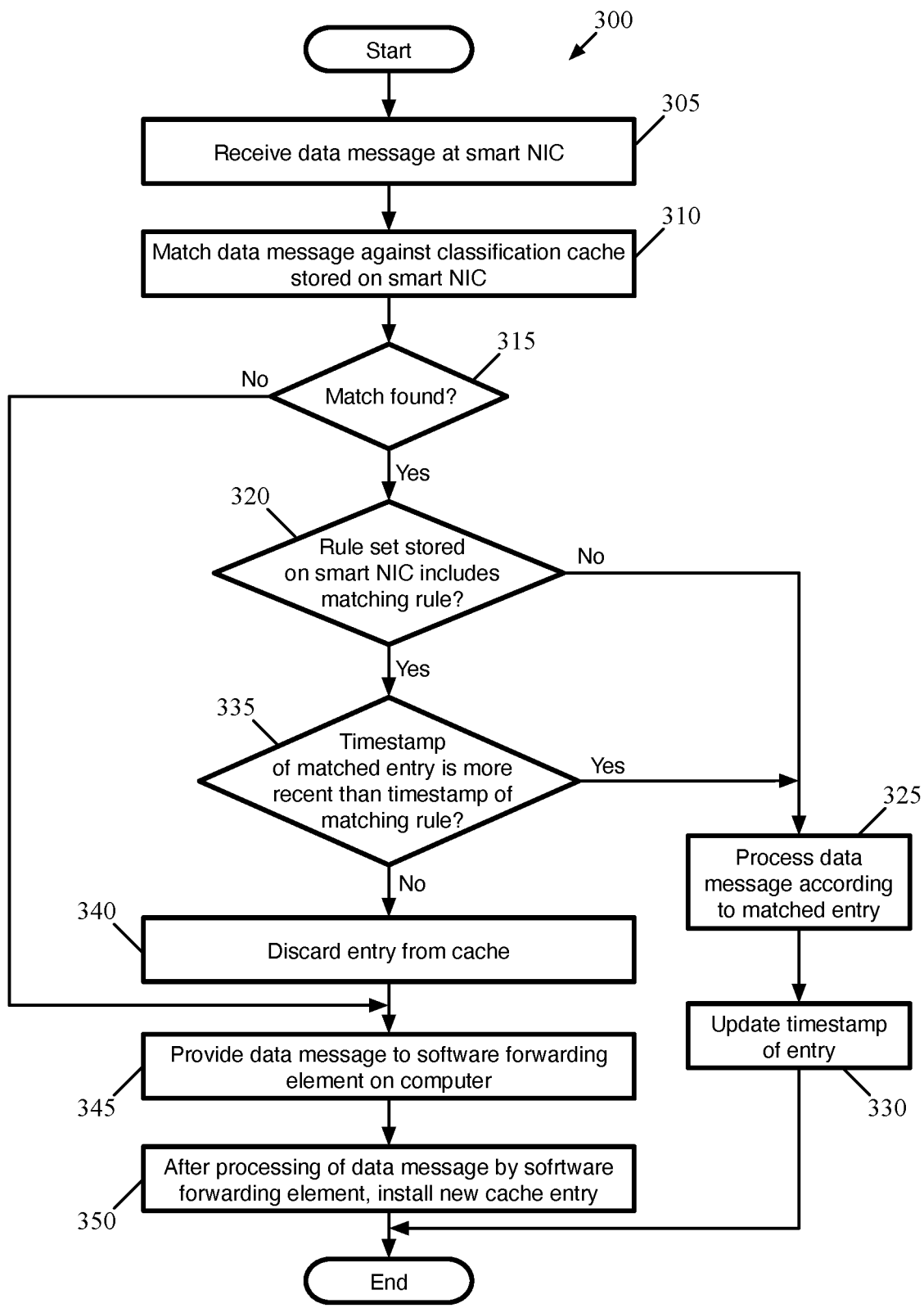
FIG. 3 conceptually illustrates a process for processing a data message received at a smart NIC.

FIG. 3 conceptually illustrates a process 300 for processing a data message received at a smart NIC. The process 300 is performed at least in part by the CPU of the smart NIC. In some embodiments, a data message processing ASIC (or FPGA) of the smart NIC performs some of the operations as well (e.g., identifying matching entries for data messages). The process 300 will be described in part by reference to FIGS. 4 and 5A-B, which illustrate examples of the use of a cache on a smart NIC to process data messages. The process 300, in some embodiments, is performed for each data message received at the smart NIC (in many cases, the process is performed in parallel for numerous data messages).

As shown, the process 300 begins by receiving (at 305) a data message at the smart NIC. In some embodiments, the SFE (and thus the smart NIC) primarily processes data messages received from outside the computer. The SFE can be configured to process these data messages and then deliver the data messages to another application executing on the computer, to process the data messages and forward the data messages to another destination (or return a data message to the source), etc. For instance, the computer might execute a domain name system (DNS) server, a dynamic host configuration protocol (DHCP) server, or an address resolution protocol (ARP) proxy that receives messages (e.g., DNS requests, DHCP requests, ARP requests) and sends replies. In some embodiments, the SFE for which the smart NIC processes data messages represents one or more virtualized network functions (VNFs) executing on the computer, with the actions taken by the VNF(s) incorporated into the cache entries. Other examples include various machine learning applications, such as a computer executing a parameter server for one or more ML models.

In addition, in certain situations, the smart NIC receives data messages originating from the computer (e.g., from virtual machines (VMs) or other data compute nodes executing on the computer). However, such data messages would typically require initial processing by the SFE on the computer (e.g., a virtual switch) in order for the SFE to determine that the data message should be sent to the smart NIC for processing. In some such embodiments, the SFE only offloads to the smart NIC data messages that the SFE knows can be handled by the smart NIC, because having the SFE pass a data message to the smart NIC only for the data message to be returned to the SFE for processing is inefficient.

The process 300 then matches (at 310) the received data message against a classification cache stored on the smart NIC. In some embodiments, the smart NIC stores a classification cache with cache entries populated by the SFE based on data message processing results at the SFE. In some embodiments, each cache entry includes (i) a set of match conditions for data messages belonging to the same data message flow as that processed data message and (ii) a set of actions for the smart NIC to perform on these subsequent data messages (e.g., to modify specific headers of the data message, to provide the data message to a data compute node executing on the computer, to forward the data message to a particular output interface, etc.).

In some embodiments, the cache entries all match on the same message header fields, such as a connection 5-tuple of source and destination network (e.g., IP) addresses, transport layer protocol, and source and destination transport layer port numbers. Using the same set of message header fields for all cache entries speeds up processing, in some embodiments, because one set of fields can be extracted and matched against all of the cache entries at once. Other embodiments, however, allow for different cache entries to match on different sets of message header fields. In some embodiments, the smart NIC performs the match operation in a manner dictated by a message processing ASIC of the smart NIC (e.g., using a hash of the data message header fields).

Next, the process 300 determines (at 315) whether a matching cache entry is found for the data message. If the data message is the first data message in a flow received at the smart NIC, or the first received in a long enough period of time that a previous entry has been removed from the cache, then the smart NIC classification cache will not have a matching entry for the data message. If no cache entry is found, the process 300 proceeds to 345, which is described below.

On the other hand, when a matching cache entry is found for the data message, the process determines whether this matched entry is still valid. The data message processing rules used by the SFE may be modified (e.g., rules can be deleted, new rules can be added, etc.) in real-time based on, e.g., updates from a network management and control system. As such, a cache entry for a data message flow could have been created prior to a rule update that affects how the data message flow should be processed. Rather than invalidating some or all cache entries every time a rule update is received, the smart NIC validates cache entries each time one of the entries is matched by storing the most recently updated rules in a rule table (or other data structure) along with timestamps indicating the time that the rule was updated (e.g., when the update was received by the SFE). In some embodiments, when a rule is updated at the SFE, the SFE provides this rule update to the smart NIC rule set along with a timestamp indicating the time that the rule was changed.

Thus, the process 300 determines (at 320) whether the rule set (e.g., rule update table) stored on the smart NIC includes one or more rules matched by the received data message. The rule updates, in some embodiments, do not necessarily match on the same data message header fields, because rule updates may not be rules for a specific flow. As examples, rules implementing new static routes might match on ranges of network addresses and new firewall rules could match on groups of network or data link layer addresses, groups of transport layer port numbers, or other criteria. The list of new rules, however, is generally not that large and therefore will not necessarily be processing or time-intensive to search. It should be noted that, for faster processing, some embodiments perform this check for all data messages while the data message is matched against the cache entries so that if a match is found in the cache any matching rule updates will already have been found.

If the data message does not match any of the rule updates stored on the smart NIC, the process does not need to perform any additional validation because the cache entry can be assumed to be valid. Thus, the process 300 processes (at 325) the data message according to the matched cache entry. That is, the smart NIC applies the action or actions specified by the cache entry to the data message. These actions may include dropping the data message, modifying one or more header fields of the data message, outputting the data message via a particular physical port of the smart NIC, providing the data message to a particular data compute node on the computer (e.g., via a physical or virtual function of the smart NIC), etc.

In some embodiments, the process 300 also updates (at 330) the timestamp of the matched cache entry, then ends. Some embodiments do not update these timestamps, such that the timestamp of each cache entry is always the creation time of that entry. Other embodiments update the timestamp each time a cache entry is used or update cache entries only some of the time. For instance, some embodiments update cache entry timestamps randomly in a non-deterministic manner so that most of the time the timestamp is not updated but a small percentage of the time the timestamp is updated. From a consistency standpoint, updating the timestamp is not necessary and takes additional processing power and time (because if a rule update requires invalidation of a cache entry, the cache entry will not make it to the timestamp update). However, as described in more detail below, the timestamp information is useful for determining which cache entries to evict if the cache reaches a maximum size.

If the data message matches at least one of the rules stored on the smart NIC, the process 300 determines (at 335) whether the timestamp of the matched cache entry is more recent than the timestamp of the matching rule or rules (e.g., the most recent rule updated that the data message matches). In some embodiments, both the rule updates and the cache entry have timestamps. The rule update timestamps indicate the time that the rule was changed at the SFE while the cache entry timestamps indicate either the time the cache entry was created or the time the cache entry was last matched and validated, in different embodiments. Cache entries that have earlier timestamps than one or more rule updates that could change the processing of data messages matching the cache entries should not be used because these could result in data messages being processed according to out-of-date rules. However, if the cache entry is newer than any of these rule updates, then the cache entry was generated according to the most up-to-date set of rules for the data message flow.

Figure 4:
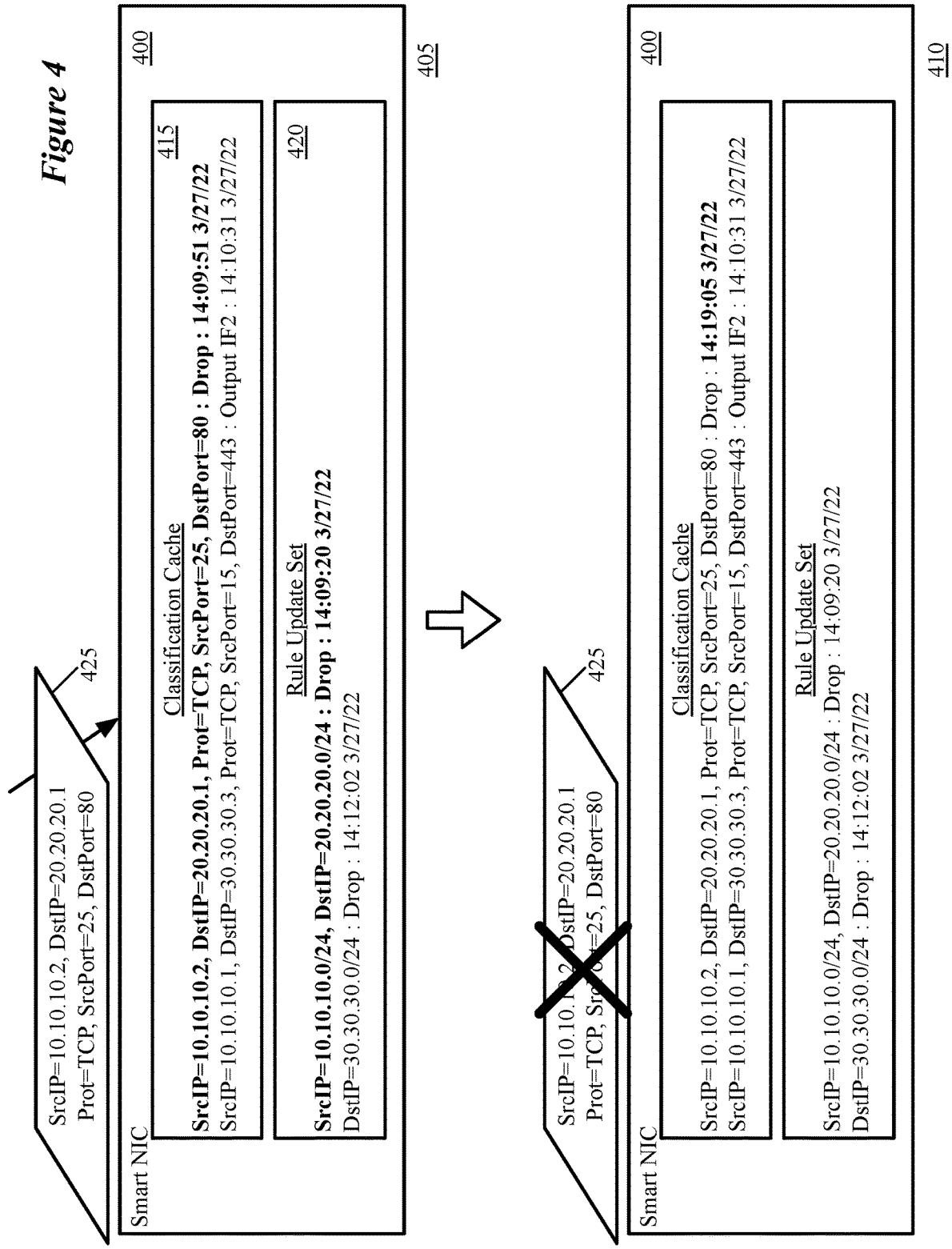
FIG. 4 conceptually illustrates an example of a smart NIC processing a data message according to a valid cache entry.

As such, if the timestamp of the cache entry is more recent than the timestamp of any rule updates matched by the data message, the cache entry is validated and the process 300 proceeds to 325, described above (as though no rules in the rule updates match the data message). FIG. 4 conceptually illustrates an example of a smart NIC 400 processing a data message according to a valid cache entry over two stages 405-410. As shown, the smart NIC 400 includes a classification cache 415 and a rule update set 420. For simplicity, the cache 415 includes only two entries and the rule update set 420 only includes two rule updates. Each of the cache entries specifies (i) a connection 5-tuple against which received data messages are matched, (ii) a set of actions to take on matching data messages, and (iii) a timestamp. These timestamps, as previously described, may be either the initial creation time of the cache entry or the time the entry was last used.

The rule updates each specify a set of match conditions as well as actions and timestamps. It should be noted that while the rule updates are shown as rules that include actions, in some embodiments, the rule updates simply specify match conditions (with timestamps) as the specified actions are not meaningful because the smart NIC is only determining whether the data message matches any of these rules.

Furthermore, the rule updates could relate to rules being added, modified, or deleted from the SFE.

In the first stage 405, the smart NIC 400 receives a data message 425. This data message is a TCP data message with a source IP address 10.10.10.2, a destination IP address 20.20.20.1, a source port number 25, and a destination port number 80. As such, the data message matches the first entry in the classification cache 415 with a timestamp of 14:09:51 on 3/27/2022, specifying to drop matching data messages (shown in bold). As a result, the smart NIC 400 also determines whether the data message matches any of the rule updates, thereby identifying a matching rule update with a timestamp of 14:09:20 on 3/27/2022 (also shown in bold).

Because the timestamp of the matched cache entry is later than the matched rule update, that rule update was accounted for in the generation of the cache entry (in fact, the rule update could be the reason for the drop action) and thus the cache entry is valid. As such, in the second stage 410, the smart NIC drops the data message 425.

Returning to FIG. 3, if the timestamp of the matched cache entry is older than the rule update (or, in some embodiments, exactly the same as the timestamp of the rule update), then the cache entry is assumed to be invalid and the process 300 discards (at 340) the cache entry. For instance, if a rule is identified as having been deleted more recently than the cache entry, the cache entry might have been generated based in part on that deleted rule. If a rule is identified as having been added more recently than the cache entry, then the cache entry would not have been generated based on that new rule and therefore might specify incorrect actions to be taken on the data message. The smart NIC, in some embodiments, evicts the entry from the cache.

The process 300 also provides (at 345) the data message to the SFE executing on the computer for the SFE to process. As noted, in different embodiments, this SFE could be a virtual switch, a combination of software forwarding elements such as one or more virtual switches and/or virtual routers, a virtualized or containerized network function operating on a VM or container, or other set of data message processing operations. The smart NIC provides the data message to the SFE via a physical or virtual function in some embodiments.

The SFE then processes the data message to determine a set of actions to apply to the data message and applies these actions to the data message (which may involve sending the data message out via an interface of the smart NIC). After the SFE processes the data message, the SFE also provides a new cache entry to the smart NIC. The process 300 installs (at 350) this new cache entry in its classification cache, then ends. In some embodiments, the smart NIC CPU receives the cache entry and adds the cache entry to a cache stored by the data message processing ASIC of the smart NIC.

Figure 5B:
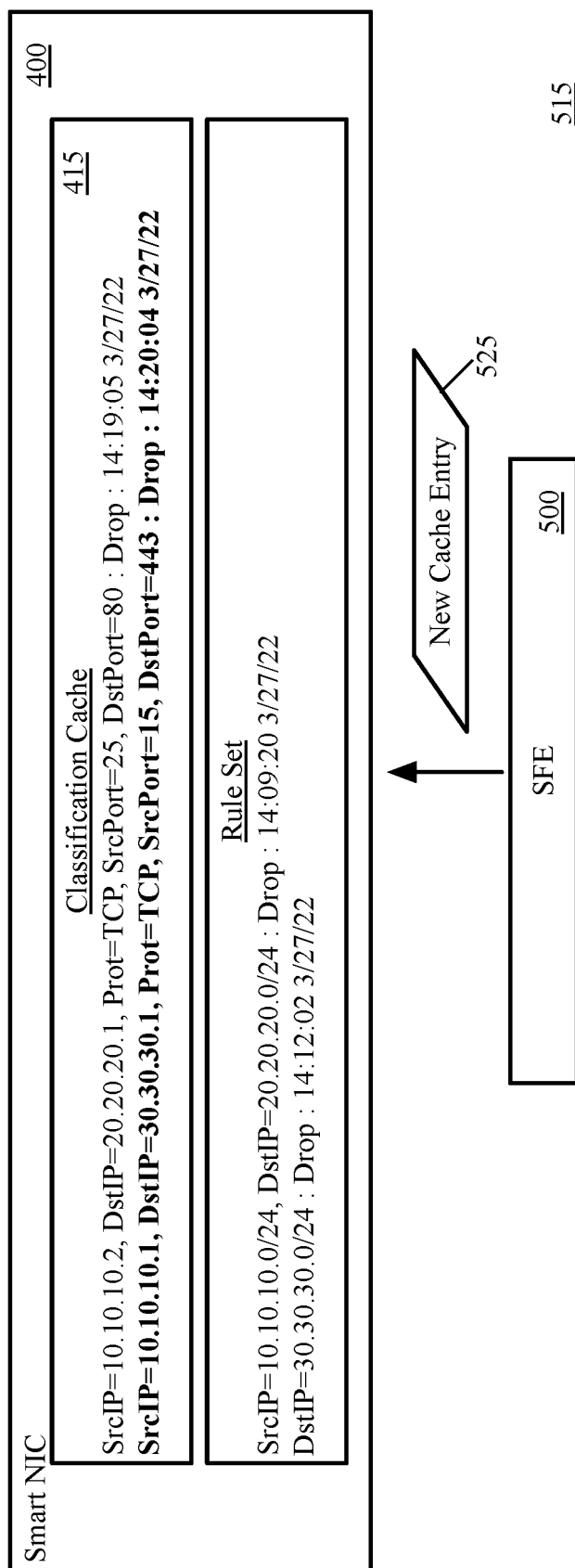

FIGS. 5A-5B conceptually illustrate an example of the smart NIC 400 identifying that a data message matches an out-of-date cache entry and providing the data message to an SFE 500 for processing over three stages 505-515. In the first stage 505, the smart NIC 400 receives a data message 520. This data message is a TCP data message with a source IP address 10.10.10.1, a destination IP address 30.30.30.1, a source port number 15, and a destination port number 443. As such, the data message matches the second entry in the classification cache 415 with a timestamp of 14:10:31 on 3/27/2022, specifying to output matching data messages to interface IF2 (shown in bold). As a result, the smart NIC 400 also determines whether the data message matches any of the rule updates, thereby identifying a matching rule update with a timestamp of 14:12:02 on 3/27/2022 (also shown in bold).

Because the timestamp of the matched cache entry is earlier than the matched rule update, the cache entry is out of date and may not provide the correct action for the data message 520. As such, in the second stage 510, the smart NIC 400 provides the data message (e.g., via a physical or virtual function or via a different data pathway) to the SFE 500 executing on a computer to which the smart NIC is attached. The SFE 500 processes the data message 520 and, as a result of this processing, provides a new cache entry 525 to the smart NIC 400 in the third stage 515. The smart NIC 400 installs this new cache entry (shown in bold) into the classification cache 415. Potentially based on the rule update identified in the first stage 505, the new cache entry (with a timestamp of 14:20:04 on 3/27/2022) specifies to drop subsequent data messages belonging to this data flow.

In some embodiments, the cache stored on the smart NIC is relatively small (e.g., may only hold several dozen cache entries) due to size limitations of the smart NIC and/or a desire for very fast processing of incoming data messages. In certain contexts, when the SFE primarily processes data messages for a small number of large data message flows, the primary savings realized by using the smart NIC comes from having cache entries for these large data message flows so that the many data messages belonging to these flows do not need to be passed on for processing by the SFE. For instance, in a distributed machine learning context, if the smart NIC is located at a parameter server, very large flows providing parameter data may be received on a regular basis.

Because of the small cache size, once the cache has reached a fixed maximum size, some embodiments evict entries from the cache as new entries are added. To determine which existing cache entry should be evicted when a new cache entry is added from the SFE, some embodiments utilize a least recently used (LRU) metric or LRU approximation metric. As described above, some embodiments update the cache entry timestamps each time a data message matches a cache entry and that entry is validated. In this case, the cache entry with the earliest timestamp is the LRU entry and can be evicted. This same metric can be used in the case that the cache entry timestamps are only updated occasionally (e.g., every X data messages or on a random basis), if updating the cache entries with every data message is too time-consuming.

Even when the timestamps are only updated occasionally, keeping track of the earliest timestamp (or identifying the earliest timestamp each time a new cache entry is added) can be computationally expensive. Instead, some embodiments store a separate field that is used to approximate an identification of the LRU cache entry. This separate field attempts to identify the oldest timestamp but is updated in a lazy manner. When a cache entry needs to be evicted, the cache entry identified by this separate field as having the oldest timestamp is chosen and evicted from the cache.

If using any approximation metric to evict cache entries (or even when updating timestamps with every data message and then using these timestamps for eviction), it is possible that a cache entry for an ongoing data message flow will be evicted from the cache. However, the system is self-correcting in this case, in that the processing of this data message flow will not be adversely affected. The next data message will take slightly longer to process because it will be passed to the SFE and the cache entry regenerated, but the data message will still be processed correctly and the cache entry will be reinstalled.

In some embodiments, the rule update table stored on the smart NIC is also size-limited. However, whereas the cache entries can be evicted without any concern that data messages will be processed incorrectly, the same does not apply to rule updates. If a rule update is removed from the update table, it is possible that some of the existing cache entries will be invalid but still used for processing data messages. While it is possible to identify each cache entry that is potentially affected by a rule update and evict these entries from the cache when removing a rule update from the table, this would be a very computationally intensive process and thus an inefficient use of resources.

Instead, some embodiments regularly clear out the entire rule update table while also invalidating the entire cache. In some embodiments, the smart NIC clears out the entire rule update table and invalidates the cache at regular time intervals (e.g., every 30 seconds, every 5 minutes, etc.). These time intervals, in some embodiments, are related to the typical frequency of rule updates in a system. In different systems, rules may be updated often due to, e.g., regular migration of VMs and/or containers or very irregularly in a more static system. In other embodiments, the smart NIC clears out the entire rule update table and invalidates the cache when the rule update table reaches a prespecified maximum size.

Figure 6:
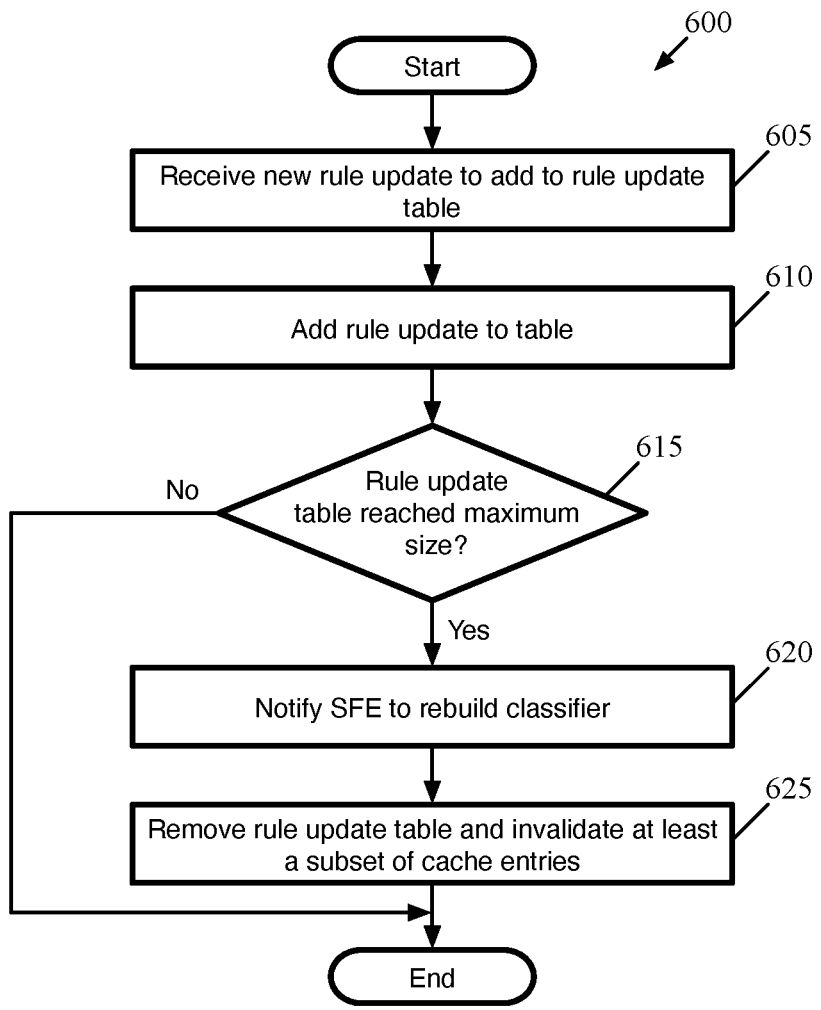
FIG. 6 conceptually illustrates a process of some embodiments for deleting the rules in the rule update table and correspondingly invalidating a cache.

FIG. 6 conceptually illustrates a process 600 of some embodiments for deleting the rules in the rule update table and correspondingly invalidating a cache. The process 600 is performed by a smart NIC in some embodiments that operates to process data messages as described above by reference to the process 300.

As shown, the process 600 begins by receiving (at 605) a new rule update to add to the rule update table. In some embodiments, the smart NIC receives rule updates directly from a controller that also sends the rule updates to the SFE. In other embodiments, the SFE is configured to provide rule updates to the smart NIC as those updates are received at the SFE. In some embodiments, the rule updates provided to the smart NIC specify the entire rule (i.e., the match conditions and actions, whether the rule is added, deleted, or modified, etc.). In other embodiments, only the match conditions for the rule update are provided to the smart NIC, as only these match conditions are necessary to determine whether or not a cache entry is valid or not.

The process 600 then adds (at 610) the rule update to the rule update table. As noted, different embodiments may delete the rules of the rule update table based on different criteria (e.g., reaching a maximum size, a timer). In this example, the rule update table is cleared out and the cache invalidated when the table reaches a maximum number of updates.

Thus, upon adding the rule update to the table, the process 600 determines (at 615) whether the rule update table has reached a maximum size. In some embodiments, the smart NIC makes this determination when the number of updates in the rule update table comes within a particular number of the maximum size, to avoid receiving a batch of updates that pushes the table past the maximum size. Other embodiments wait until the number of rule updates reaches all the way to maximum size that can be held in the table. If the rule update table has not reached the maximum size, the process 600 ends, as there is no need to clear out the table and/or cache.

However, if the rule update table has reached the maximum size, the process 600 notifies (at 620) the SFE to rebuild its classifier. In some embodiments, when the smart NIC clears out the rule update table, the SFE rebuilds its classifier data structure used for data message processing.

Depending on the type of SFE, this classifier can be a set of decision trees, a set of hash tables, or another data structure that amalgamates the rules enforced by the SFE. A typical SFE does not rebuild its classifier every time a rule update is received, because the rebuild process is resource intensive. In a dynamic environment with quickly changing rules (e.g., due to migration of data compute nodes), the SFE could be constantly rebuilding its classifier data structure.

Instead, the classifier rebuilds its data structure at time intervals or after the receipt of a particular number of rules. It should be noted that the SFE nevertheless applies any new rule updates to its data message processing right away, prior to incorporating these rule updates into the classifier data structure (doing otherwise would risk the continued processing of data messages with outdated rules). The SFE applies these rule updates outside of its classifier data structure, then rebuilds the classifier so that the faster data message processing enabled by the classifier incorporates these rule updates.

The process 600 also removes (at 625) the rule update table (or removes all of the rule updates from the rule update table) and invalidates at least a subset of the cache entries, then ends. Because the smart NIC no longer stores these rule updates and therefore cannot use the rule updates to validate matched cache entries, the smart NIC invalidates these cache entries to ensure that data messages are not processed using entries based on out-of-date rules. Some embodiments simply invalidate all of the cache entries and allow the valid entries to be generated and reinstalled by the SFE data message processing for those data message flows. Other embodiments search through the timestamps of the cache entries to identify entries that are newer than any of the rule updates. However, if the rule update table is deleted right after receiving a rule update (rather than after a predetermined time interval), very few (if any) of the cache entries will be newer than the most recent rule update, even if timestamps are updated with the processing of each data message. Additionally, even if the rule update table is deleted after a predetermined time interval, determining which cache entries remain valid is computationally expensive, as it requires analysis of all of the timestamps of the rule updates as well as the cache entries. Given this, it is often easier to simply rebuild the cache based on data message processing of the SFE.

Some embodiments, to avoid either (i) invalidating all of the cache entries or (ii) comparing timestamps between cache entries and rule updates, use a sliding window technique with a set of multiple caches with different creation times. At regular intervals (a shorter interval than the time interval between rule update table removals), the smart NIC creates a new (empty) cache and deletes the oldest cache. For instance, if the rule update table is deleted every 15 minutes, the new caches could be created every 5 minutes (but offset from the rule update removal by 1 minute so that the newest cache is always created 1 minute prior to the rule update removal).

When a data message arrives, the smart NIC selects one of the current caches to query for a matching cache entry. In different embodiments, the smart NIC may use a round robin algorithm to select the cache for each data message, a randomization technique (e.g., hashing a set of header values that vary between data messages of a data flow so that an individual flow is not always matched against the same cache), etc. If the selected cache does not have a matching cache entry for the data message, the data message is sent to the SFE executing on the host computer (as described above) and a new cache entry is generated and installed in that cache. As a result of the data messages for a flow being sent to the different caches, the SFE will install entries in all of the caches for the most common data message flows.

Thus, when the SFE classifier is rebuilt and the rule update table is removed, the most recently created cache should be more recent than the last rule update. This most recent cache does not need to be invalidated, even without checking all of the cache entry and rule update timestamps. Even if this most recent cache does not have an entry for every ongoing flow, it will typically include entries for the most common data message flows and is therefore still useful.

Figure 7B:
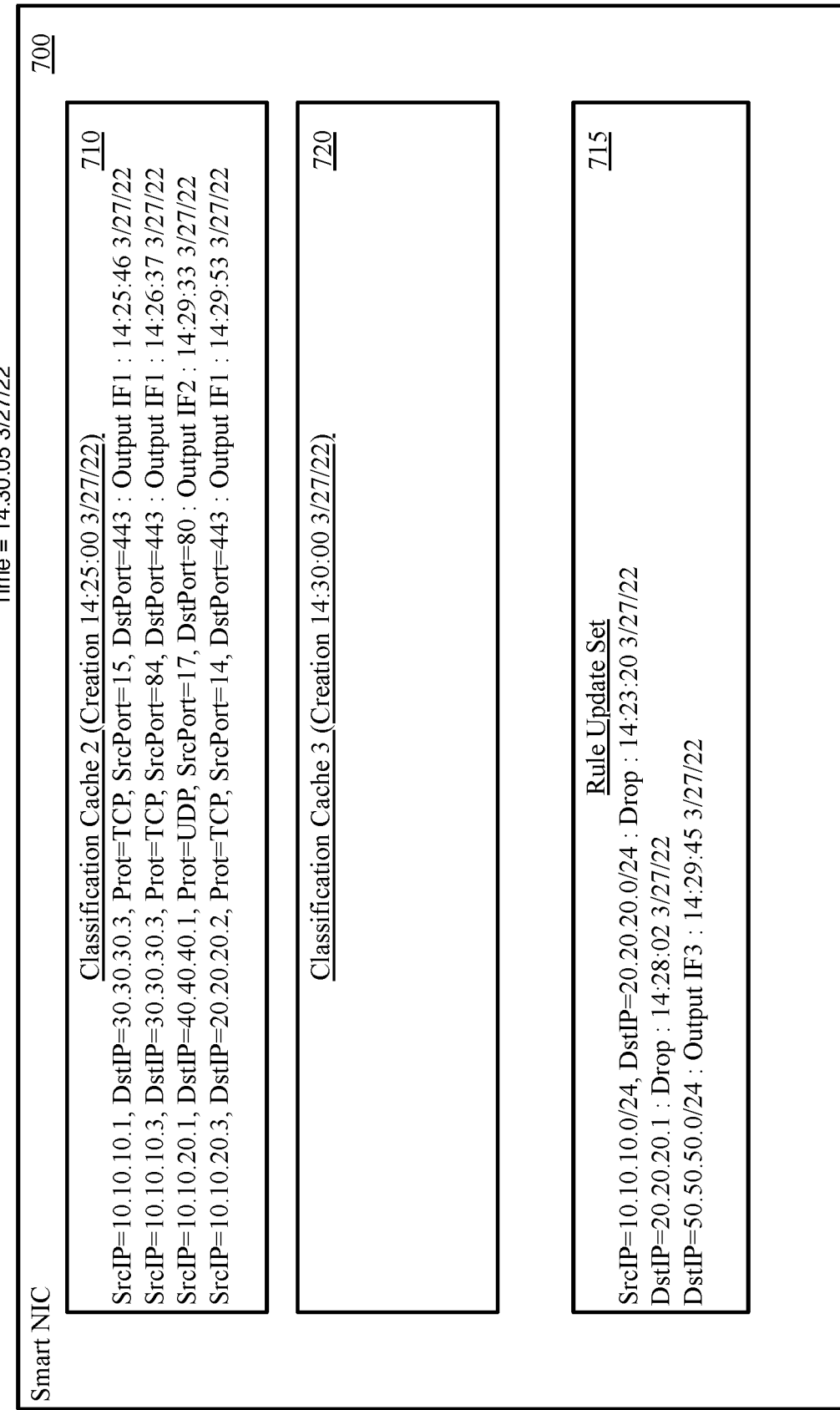

FIGS. 7A-C conceptually illustrate the use of sliding window caches such that a cache with valid entries remains when a rule update table is deleted. FIG. 7A shows the two classification caches 705 and 710, as well as a rule update table 715, stored by a smart NIC 700 at a time 14:30:00. The first cache 705, created at time 14:20:00, includes entries for four data message flows. As shown by the timestamps, these four cache entries were created in the last ten minutes. The second cache 710, created at time 14:25:00, also includes entries for four data message flows (created in the last five minutes). Three of the data message flows in the first cache 705 are also present in the second cache 710, while one of the flows in each of the caches is not present in the other. In addition, at this point in time, three rule updates are present in the rule update table 715. The most recent of these three rule updates has a timestamp of 14:29:45.

In the smart NIC 700, each cache lasts for ten minutes and a new cache is created every five minutes (while deleting the oldest cache). As such, at time 14:30:00, the first cache 705 is invalidated. FIG. 7B illustrates the smart NIC 700 at time 14:30:05 (five seconds later), at which point a new cache 720 has been created. At this point, the new cache 720 does not yet have any entries installed, but the second cache 710 still has all of its cache entries that can be used to process data messages for which it is the selected cache.

FIG. 7C illustrates the smart NIC 700 at 14:31:00, at which time the rule update set 715 is removed and the oldest existing cache 710 is invalidated because its creation time is older than the latest rule update. By this time, the recently created cache 720 has entries for three of the data message flows that are also present in the now-invalidated cache 710, so any data messages belonging to these flows can still be processed if this cache is selected. Furthermore, the smart NIC will subsequently create another cache and new entries will be installed in that cache.

Figure 8:
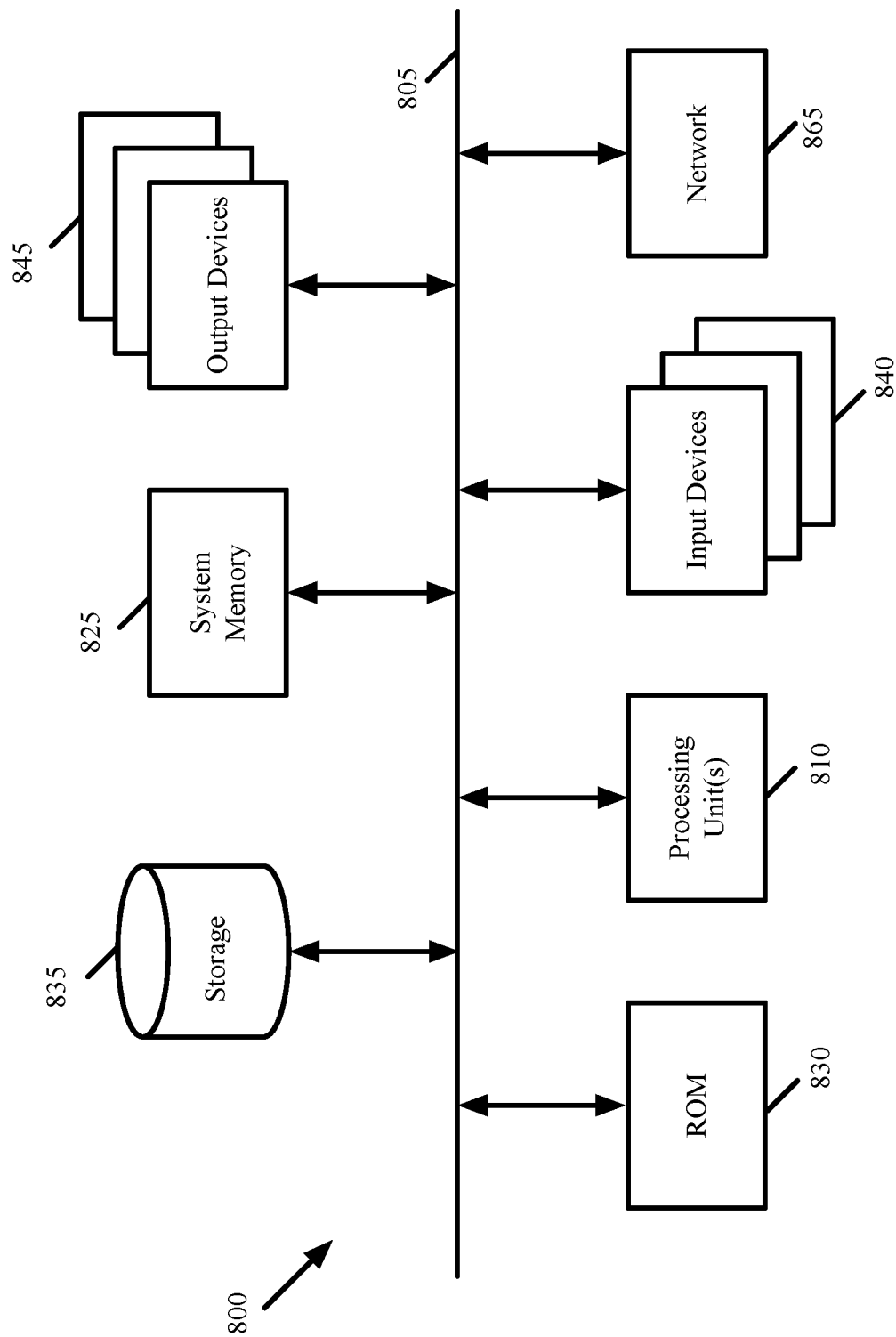
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for performing data message processing at a computer that executes a software forwarding element (SFE), the method comprising:
   at a smart network interface controller (NIC) of the computer:
   storing (i) a set of cache entries that the smart NIC uses to process a set of received data messages without providing the data messages to the SFE and (ii) rule updates used by the smart NIC to validate the cache entries;
   after a period of time, determining that the rule updates are incorporated into a data message processing structure of the SFE; and
   upon incorporating the rule updates, deleting from the smart NIC (i) the rule updates and (ii) at least a subset of the cache entries.

2. The method of claim 1, wherein the period of time is based on the stored rule updates reaching a particular size.

3. The method of claim 1, wherein the period of time is a predefined time duration.

4. The method of claim 1, wherein the rule updates are used by the smart NIC to validate a cache entry matched by a data message by verifying that the data message is not subject to any rule updates that were not available when the matched cache entry was generated.

5. The method of claim 1 further comprising, prior to incorporating the rule updates:
   receiving a new cache entry from the SFE based on the SFE processing a data message; and
   storing the new cache entry on the smart NIC while deleting a least recently used cache entry from the stored set of cache entries.

6. The method of claim 5, wherein the least recently used cache entry is determined based on timestamps of the cache entries.

7. The method of claim 5, wherein the least recently used cache entry is identified for deletion by using a field that approximates identification of the cache entry used least recently.

8. The method of claim 1, wherein the SFE incorporates the rule updates into the data message processing structure by rebuilding a classifier used to process data messages.

9. The method of claim 8, wherein the SFE uses the rule updates to process data messages prior to rebuilding the classifier.

10. The method of claim 1, wherein:
    deleting at least a subset of the cache entries comprises deleting all of the cache entries; and
    subsequent data messages received at the smart NIC are provided to the SFE for the SFE to process the data messages using the data message processing structure and rebuild the cache with new cache entries based on the processing of the data messages by the SFE.

11. The method of claim 1, wherein:
    the set of cache entries are stored in at least two caches on the smart NIC; and deleting the subset of the cache entries comprises deleting a subset of the caches such that at least one cache is not deleted and is used for processing subsequent data messages.

12. The method of claim 11, wherein each cache entry corresponds to at least one data message flow, wherein cache entries corresponding to a particular set of most commonly processed data message flows are stored in all of the caches on the smart NIC.

13. The method of claim 11, wherein the at least one cache that is not deleted is a newest cache created after receipt of a newest rule update of the set of rule updates.

14. A non-transitory machine-readable medium storing a program for execution by at least one processing unit of a smart network interface controller (NIC) of a computer that executes a software forwarding element (SFE), the program for performing data message processing, the program comprising sets of instructions for:
   storing (i) a set of cache entries that the smart NIC uses to process a set of received data messages without providing the data messages to the SFE and (ii) rule updates used by the smart NIC to validate the cache entries;
   after a period of time, determining that the rule updates are incorporated into a data message processing structure of the SFE; and
   upon incorporating the rule updates, deleting from the smart NIC (i) the rule updates and (ii) at least a subset of the cache entries.

15. The non-transitory machine-readable medium of claim 14, wherein the period of time is based on the stored rule updates reaching a particular size.

16. The non-transitory machine-readable medium of claim 14, wherein the period of time is a predefined time duration.

17. The non-transitory machine-readable medium of claim 14, wherein the rule updates are used by the smart NIC to validate a cache entry matched by a data message by verifying that the data message is not subject to any rule updates that were not available when the matched cache entry was generated.

18. The non-transitory machine-readable medium of claim 14, wherein the program further comprises sets of instructions for, prior to incorporating the rule updates:
   receiving a new cache entry from the SFE based on the SFE processing a data message; and
   storing the new cache entry on the smart NIC while deleting a least recently used cache entry from the stored set of cache entries.

19. The non-transitory machine-readable medium of claim 18, wherein the least recently used cache entry is determined based on timestamps of the cache entries.

20. The non-transitory machine-readable medium of claim 18, wherein the least recently used cache entry is identified for deletion by using a field that approximates identification of the cache entry used least recently.

21. The non-transitory machine-readable medium of claim 14, wherein the SFE (i) incorporates the rule updates into the data message processing structure by rebuilding a classifier used to process data messages and (ii) uses the rule updates to process data messages prior to rebuilding the classifier.

22. The non-transitory machine-readable medium of claim 14, wherein:
   the set of instructions for deleting at least a subset of the cache entries comprises a set of instructions for deleting all of the cache entries; and
   subsequent data messages received at the smart NIC are provided to the SFE for the SFE to process the data messages using the data message processing structure and rebuild the cache with new cache entries based on the processing of the data messages by the SFE.

23. The non-transitory machine-readable medium of claim 14, wherein:
   the set of cache entries are stored in at least two caches on the smart NIC; and
   the set of instructions for deleting the subset of the cache entries comprises a set of instructions for deleting a subset of the caches such that at least one cache is not deleted and is used for processing subsequent data messages.

24. The non-transitory machine-readable medium of claim 23, wherein each cache entry corresponds to at least one data message flow, wherein cache entries corresponding to a particular set of most commonly processed data message flows are stored in all of the caches on the smart NIC.

25. The non-transitory machine-readable medium of claim 23, wherein the at least one cache that is not deleted is a newest cache created after receipt of a newest rule update of the set of rule updates.

* * * * *